United States Patent [19]

Herbermann

[11] Patent Number: 5,071,309
[45] Date of Patent: Dec. 10, 1991

[54] MOUNTING ARRANGEMENT FOR A MULTI-FUNCTION ARM

[75] Inventor: Alfred F. Herbermann, Ann Arbor, Mich.

[73] Assignee: Syron Engineering & Manufacturing Corporation, Saline, Mich.

[21] Appl. No.: 563,576

[22] Filed: Aug. 6, 1990

[51] Int. Cl.$^5$ .............................................. B25J 17/00
[52] U.S. Cl. ..................................... 414/680; 901/28; 403/316; 403/353
[58] Field of Search ...................... 414/680; 901/28, 27, 901/29; 403/353, 316, 348, 349

[56] References Cited

U.S. PATENT DOCUMENTS

| | | | |
|---|---|---|---|
| 3,564,978 | 2/1971 | Flitz | 403/353 X |
| 4,370,091 | 1/1983 | Gagliardi | 901/29 X |
| 4,704,044 | 11/1987 | Yoshigai | 403/353 X |

Primary Examiner—Robert J. Spar
Assistant Examiner—Donald W. Underwood
Attorney, Agent, or Firm—Dykema Gossett

[57] ABSTRACT

A mounting arrangement is disclosed to mount an arm. The arm has a pair of spaced enlarged sections and an intermediate recessed section. The mounting arrangement has a first mount portion with an upwardly facing opening that extends for a distance greater than the diameter of the recessed section, a second mount portion spaced rearwardly of the first, and an intermediate open portion. The recessed section of the arm is positioned over the opening in the first mount portion and moved downwardly. The arm is then moved rearwardly such that the first and second enlarged sections are received within the first and second mount portions, respectively. The improved mounting arrangement provides support over a sufficient axial distance of the arm, but does not require the arm to be slid within the mounting arrangement for the entire distance. Less space is required in front of the mounting arrangement, and less force must be applied to the arm in order to move it within the mounting arrangement. A quick change electrical connector is also disclosed that allows the arm to be quickly electrically connected to a source of electricity from outside of the mounting arrangement.

20 Claims, 3 Drawing Sheets

MOUNTING ARRANGEMENT FOR A MULTI-FUNCTION ARM

BACKGROUND OF THE INVENTION

The present invention relates to mounting a multi-functional arm to a support structure. More particularly, the present invention relates to a method and apparatus for quickly mounting an arm to a support structure that is efficient in both required space and time.

Numerous types of mounting arrangements exist in the prior art for connecting an arm to a support structure. Many prior art mounting arrangements must be disassembled and subsequently reassembled to mount the arm. These arrangements are unsatisfactory since they require relatively long periods of time to complete the mounting.

Mounting arrangements in which an arm may be quickly attached without complete disassembly is the subject matter to which the present invention is directed. If an arm is slid into a mounting arrangement, it is necessary to support the arm over a sufficient axial distance, defined here as an axial support distance, such that any stresses or forces or the arm can be absorbed by the mounting arrangement. Further, if the arm is aligned with an open forward end of the mounting arrangement and slid within it for the entire axial support distance, it requires a relatively large amount of clearance distance forwardly of the mounting arrangement, which may not be available.

In several applications that utilize arms, the space in the vicinity of the mounting arrangement does not permit much room for maneuvering parts. There may be insufficient clearance for the arm to be positioned in front of the mounting arrangement over the entire axial support distance. For this reason above, prior art arrangements are undesirable.

It is axiomatic that an adequate axial support distance must be maintained in order to properly support the arm. For the reasons set forth above, it may not be possible to both provide an arm that has a portion of a length that can be properly supported and, at the same time, be short enough to fit into the mounting structure.

Another problem with prior art constructions involves arms which are utilized to mount electrical devices that require relatively complex electrical connections to power sources and controls. As will be understood by those skilled in the art, an arm that is designed for quick connection to a mounting structure, as set forth herein, presents a real problem if electrical connections are required.

Thus, it is one object of the present invention to provide a mounting arrangement for a multi-functional arm in which the arm is not positioned in front of the mounting arrangement for connection, and therefore, it is not necessary to force the arm into the mounting arrangement for the entire axial support distance.

It is another object of the present invention to provide a mounting arrangement in which an electrical device may be quickly connected to power sources or controls.

SUMMARY OF THE INVENTION

The present invention includes a mounting arrangement for mounting an arm to a support structure, such as a work transfer assembly. In a disclosed embodiment, the arm is connected to a gripper handle for workpieces. In this embodiment, electrical connections for the gripper handle pass through the arm and mounting arrangement, and into the work transfer assembly.

A disclosed embodiment of the present invention includes an arm having a first enlarged section axially spaced from a recessed section. A mounting arrangement includes a first mounting portion to support the first enlarged section. The first mounting portion includes appended flanges or legs which form an opening that is greater than the cross-sectional dimension of the recessed section. The recessed section is aligned above the opening and moved downwardly into the opening between the flanges. The arm is then moved rearwardly until the first enlarged section is received within the first mounting portion.

In a preferred embodiment of the present invention, a second enlarged section is formed on the arm on the opposite side of the recessed section from the first enlarged section. The mounting arrangement also includes a second mounting portion and an intermediate open portion between the two mounting portions. When the arm is positioned with the recessed section aligned over the aforementioned opening, the second enlarged section is aligned over the open portion. The arm is then moved downwardly and rearwardly such that the first and second enlarged sections are received within the first and second mounting portions, respectively.

An axial support distance is defined as the distance between the ends of the two mounting portions, and is the distance over which the arm is supported within the mounting arrangement. It is important that this distance be sufficient to allow the mounting arrangement to absorb any stresses or forces on the arm. An arm according to the present invention is positioned in front of the mounting arrangement at a distance much less than the axial support distance prior to mounting. The arm only need be positioned in front of the mounting arrangement for a distance approximately equal to the length of the first enlarged section. This results in a reduction in both required space and force to mount the arm, as compared to prior art arrangements, while still providing an adequate axial support distance.

In a most preferred embodiment of the present invention, a latching arrangement latches the arm within the mounting arrangement. A spring biases a latch member in the second mounting portion to pivot about an axis and force a latch tooth into a notch formed in the second enlarged section. As the arm is moved within the second mounting portion, a flange formed on the second enlarged section pivots the latch member against the force of the spring. Once the flange has moved past the latch member, the spring biases the latch member back into the notch and the arm is latched.

The second mounting portion has an intermediate slot which includes an upper face and a lower face. A locking arrangement moves the upper face downwardly toward the lower face to close the slot and reduce the inner diameter of the second mounting portion, thereby locking the second enlarged section of the arm within the second mounting portion.

A flat guide face is provided in the vicinity of the first mounting portion, and a corresponding flat guide face is formed on the bottom of the first enlarged section. The two flat faces align the arm and allow it to be guided smoothly into, or out of, the mounting arrangement.

In another aspect of the present invention, a quick change electrical connector is attached to a rear portion of the mounting arrangement. The arm has a mating electrical connection that is plugged into the electrical connector to connect the arm to power sources or controls. The flat guide faces ensure that mating plug portions in the arm and the electrical connector are properly aligned when the arm is moved within the mounting arrangement.

These and other features and objects of the present invention can be best understood from the following specification and drawings, of which the following is a brief description.

BRIEF DESCRIPTION OF THE DRAWINGS

FIG. 8 is a side view of a electrical connector according to the present invention.

FIG. 9 is a front view of the electrical connector illustrated in FIG. 8.

DETAILED DESCRIPTION OF A PREFERRED EMBODIMENT OF THE PRESENT INVENTION

Figure 1:
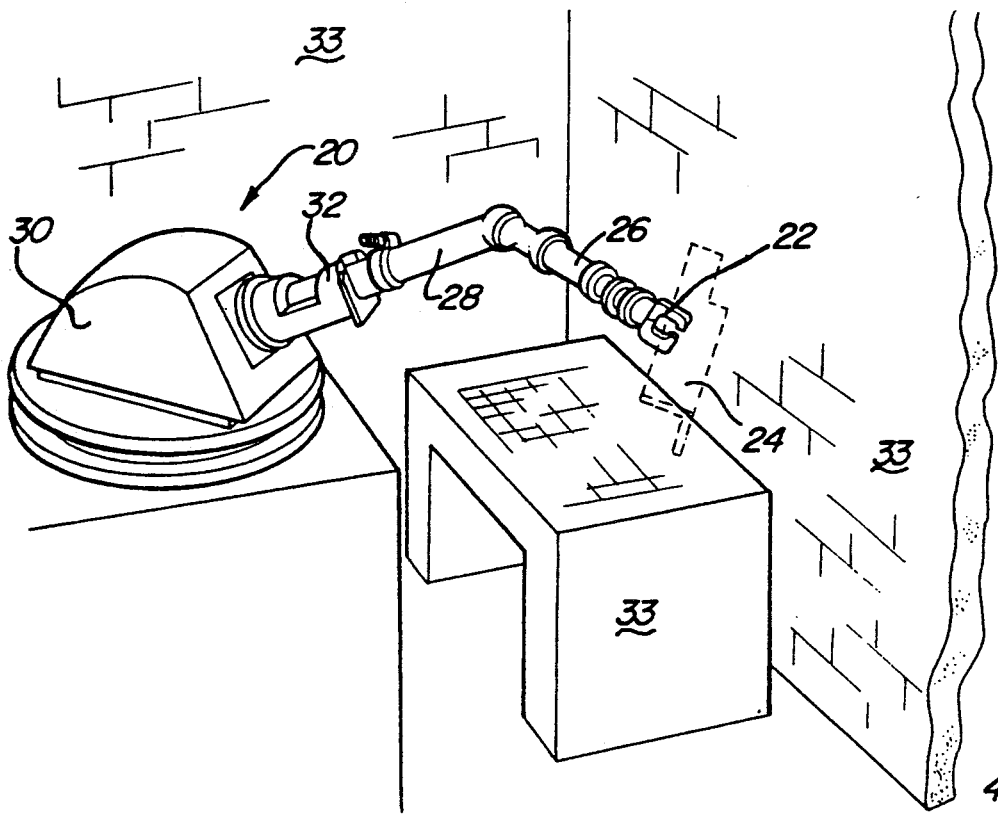
FIG. 1 is a perspective view illustrating a work transfer assembly embodying the mounting arrangement of the present invention.

Work transfer assembly 20 is illustrated in FIG. 1 having gripper handle 22 for gripping workpiece 24. A series of ball-jointed links 26 connect gripper handle 22 to arm 28. Arm 28 is connected to work transfer device 30 through mounting arrangement 32. As illustrated in this figure, walls and table 33 limit the space available for movement in the vicinity of arm 28. Walls and table 33 schematically represent other arrangements that may restrict the amount of space available for movement of arm 28. In a typical environment there may be a plurality of industrial machines or conveyor lines positioned around work transfer assembly 20 which limit available space.

Arm 28 is received within mounting arrangement 32. In the prior art, it may have been necessary to position arm 28 axially in front of a mounting arrangement. With such a prior art mounting arrangement, a relatively large amount of space would be required forwardly of the mounting arrangement. In the illustrated environment there may be insufficient space for arm 28 to be positioned forwardly of mounting arrangement 32 for its entire axial support distance. At the very least, the use of a prior art arrangement would make it difficult to mount arm 28 to work transfer device 30. In addition, the combination of gripper handle 22, ball-jointed links 26, and arm 28 is relatively cumbersome to manually maneuver, and it may be undesirable to force it into mounting arrangement 32 over the entire axial support distance.

It should be understood that although mounting arrangement 32 and arm 28 have been illustrated in combination with work transfer assembly 20, the teachings of this invention apply to any application in which any type of arm is mounted to a structure. Although work transfer device 30 would provide some movement to arm 28, the teachings of this invention also apply to the mounting of an arm to a static structure.

Figure 2:
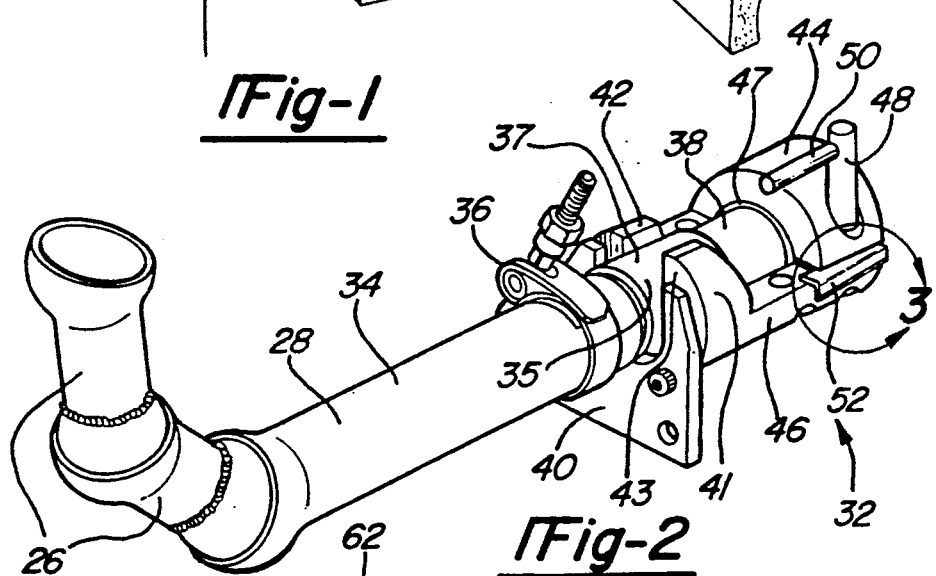
FIG. 2 is a perspective view of an arm and mounting arrangement according to the present invention.

FIG. 2 is an enlarged view showing mounting arrangement 32 mounting arm 28. Ball-jointed links 26 extend forwardly of arm 28 and may be adjusted to any one of a plurality of positions. These ball-jointed links are disclosed in U.S. Pat. No. 4,898,490, the disclosure of which is incorporated herein by reference.

In a disclosed embodiment, arm 28 consists of tubular outer member 34 extending forwardly of mounting arrangement 32 and inner mounting member 35 received within tubular outer member 34. Tubular outer member 34 is secured over inner mounting member 35 by clamp 36.

Inner mounting member 35 has a first enlarged section 37 positioned axially forwardly of intermediate recessed section 38. Mounting arrangement 32 includes mounting plate 40 positioned at a forward end and a first mounting portion 41, which receives first enlarged section 37 of arm 28. Mounting plate 40 has an upwardly open channel, and a portion of first enlarged portion 37 extends forwardly of first mounting portion 41 and rests in this channel for a purpose that will be described below. First mounting portion 41 has a pair of spaced opposed flanges 42 and 43 defining a top opening to provide an access slot to a bore within the inner periphery of flanges 42 and 43. Arm 28 and mounting arrangement 32 each extend along an axis from a forward position to a rear position. Due to the opening between flanges 42 and 43, the inner periphery of first mounting portion 41 does not extend for 360 degrees about this axis. Second mounting portion 44 is positioned axially rearwardly of first mounting portion 42, and intermediate open portion 46 is positioned between first mounting portion 42 and second mounting portion 44. Second enlarged section 47, formed rearwardly of recessed section 38, is received in second mounting portion 44. The inner periphery of second mounting portion 44 extends for approximately 360 degrees about the axis. Intermediate open portion 46 is open vertically upwardly over approximately 180 degrees about the above-discussed axis.

In a preferred embodiment of the present invention first enlarged section 37 is of a first outer dimension and recessed section 38 is of a second outer dimension smaller than the first dimension. The opening between flanges 42 and 43 is greater than the second dimension such that recessed section 38 can pass between flanges 42 and 43. The size of the channel in mounting plate 40 is greater than the first outer dimension, such that the first enlarged section 37 can pass into it. When mounting arm 28 to mounting arrangement 32, recessed section 38 is positioned over the opening between flanges 42 and 43 with first enlarged section 37 being positioned over the channel in mounting plate 40 and the second enlarged section 47 being positioned over open portion 46. As will be explained more fully below, arm 28 may then be moved downwardly and rearwardly until first and second enlarged sections 37 and 47 are received within first and second mounting portions 41 and 44, respectively.

Lock nut 48 is received within second mounting portion 44 and it includes a handle 50 to lock arm 28 within mounting arrangement 32. Latch member 52 is received in the second mounting portion 44 and latches arm 28 within mounting arrangement 32.

Figure 3:
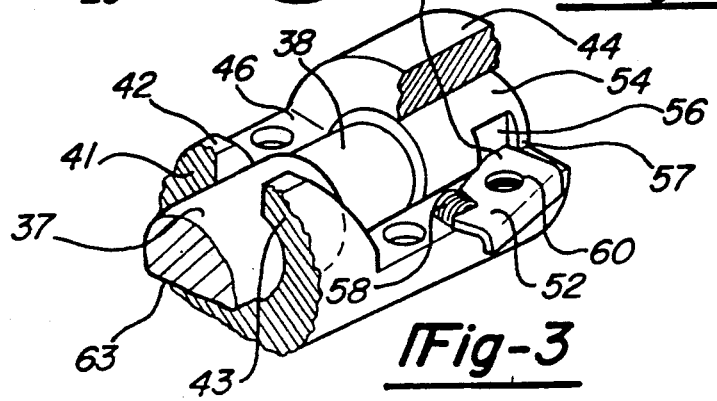
FIG. 3 is a partially cutaway view of the area identified by arrow 3 in FIG. 2.

FIG. 3 is a partially cutaway view of second mounting portion 44 and illustrates second enlarged section 47, which is of a third outer dimension greater than the outer dimension of recessed section 38. It should be understood that first mounting portion 41 has an inner dimension approximately equal to the inner dimension of first enlarged section 37, while second mounting portion 44 has an inner dimension approximately equal to the outer dimension of second enlarged section 47. First and second enlarged sections 37 and 47 may well have the same outer dimension, although that is not necessary. In addition, while sections 37, 38 and 47 are illustrated as cylindrical, they could have some other geometric configuration. If sections, 37, 38 and 47 are cylindrical, the outer dimensions discussed above are their respective diameters.

Notch 56 is formed in second enlarged section 47. Latch member 52 is biased by spring 58 about pivot 60 such that latch tooth 62 is received within notch 56. Lock nut 48 extends through pivot hole 60, and thus latch member 52 pivots about lock nut 48. When latch tooth 62 is received within notch 56, a flange 57 positioned rearwardly of notch 56 prevents movement of arm 28 outwardly of mounting arrangement 32.

As shown, latch member 52 extends radially into the bore defined by second mounting portion 44. As arm 28 is being moved into mounting arrangement 32, flange 57 contacts latch member 52 and biases it outwardly of the bore. Once flange 57 has moved past latch tooth 62, spring 58 will pivot latch member 52 back radially into the bore, and latch tooth 62 moves into notch 56. Thus, the mounting arrangement is self-latching when arm 28 is moved into it.

A flat guide face 63 is shown on a bottom portion of first enlarged section 37. Flat guide face 63 aligns with a mating guide face on mounting plate 40 to ensure that arm 28 is properly aligned within mounting arrangement 32.

Figure 4:
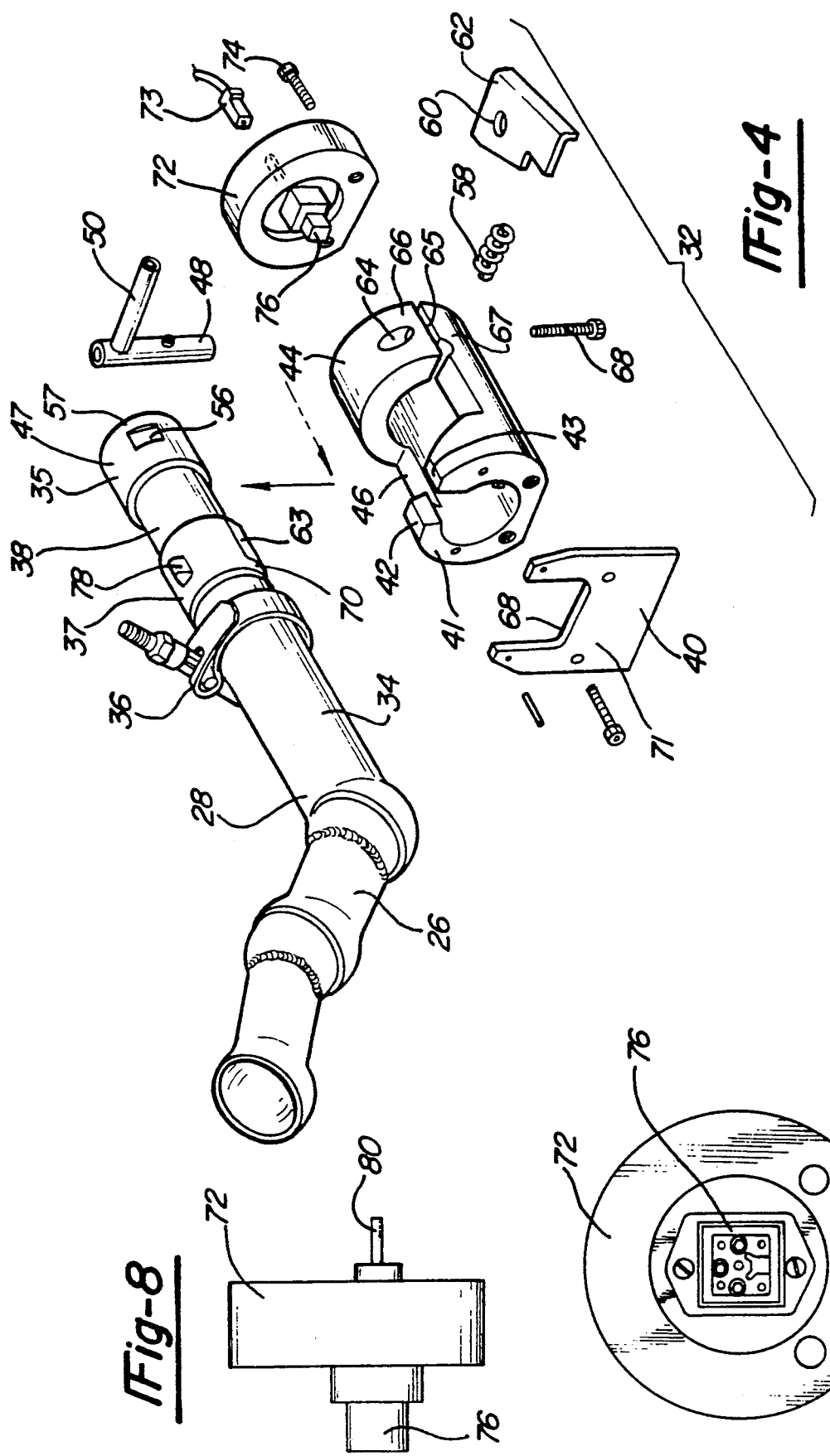
FIG. 4 is an exploded view of the arm and the mounting arrangement illustrated in FIG. 2.

Further details of mounting arrangement 32 can be understood from FIG. 4. Arm 28 has tubular outer member 34 connected to inner mounting member 35 by clamp 36. Inner mounting member 35 has first enlarged section 37, second enlarged section 47, and recessed section 38. Notch 56 is formed near a rearward end of second enlarged section 47, and flange 57 is formed rearwardly of notch 56. Lock nut 48 and handle 50 extend through aperture 64 in second mounting portion 44 and downwardly through pivot hole 60. Slot 65 is defined between upper face 66 and lower face 67 of second mounting portion 44. Bolt 68 extends upwardly through a hole formed in lower face 67, not shown, and then through pivot hole 60. Lock nut 48 is received upon bolt 68, and when turned by handle 50 tightens upper face 66 downwardly toward lower face 67, locking arm 28 within mounting arrangement 32 by reducing the inner dimension of second mounting portion 44 and tightly gripping second enlarged section 47.

Mounting plate 40 has flat guide face 68 formed parallel to and beneath the channel, and the opening in first mounting portion 41. Flat guide face 68 corresponds to flat face 63 formed on the bottom of first enlarged section 37. When arm 28 is guided into mounting arrangement 32, flat face 63 is positioned on flat guide face 68 and arm 28 is slid rearwardly. The two flat faces ensure that arm 28 is being properly aligned and smoothly guided into mounting arrangement 32.

Flat guide face 63 is slightly rotated in FIG. 4 from its actual position with respect to notch 56 so that both features can be illustrated in this figure. Flat guide face 63 extends from the rearward end of first enlarged portion 37 forwardly to flange 70, which is of the same outer dimension as the remainder of first enlarged portion 37. Flange 70 abuts lip 71 on mounting plate 40 when arm 28 is properly received within mounting arrangement 32.

Inner mounting member 35 and outer tubular member 34 are both preferably hollow lightweight members and may contain cables to supply electrical connections to gripper handle 22. If so, quick change electrical connector 72 may be connected between electrical supply 73 and a mating connection in arm 28. Bolt 74 secures connector 72 to mounting arrangement 32. Plug 76 extends forwardly of connector 72 and is connected to a mating plug in arm 28. An electrical connector 78 may extend radially outwardly of first enlarged portion 37 to be connected to electrical sensors, or other electrical devices on the outer periphery of arm 28.

Figure 5:
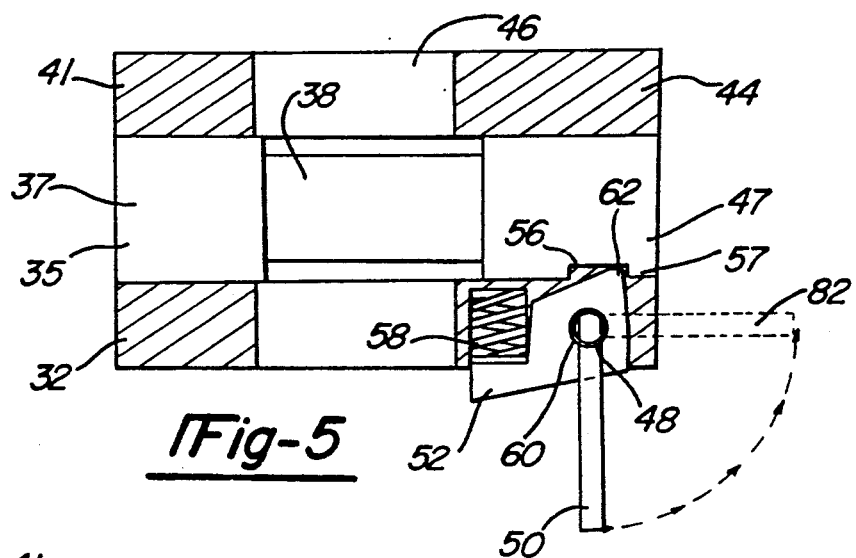
FIG. 5 is a cross-sectional view illustrating a first step in the removal of the arm from the mounting arrangement of the present invention.
Figure 6:
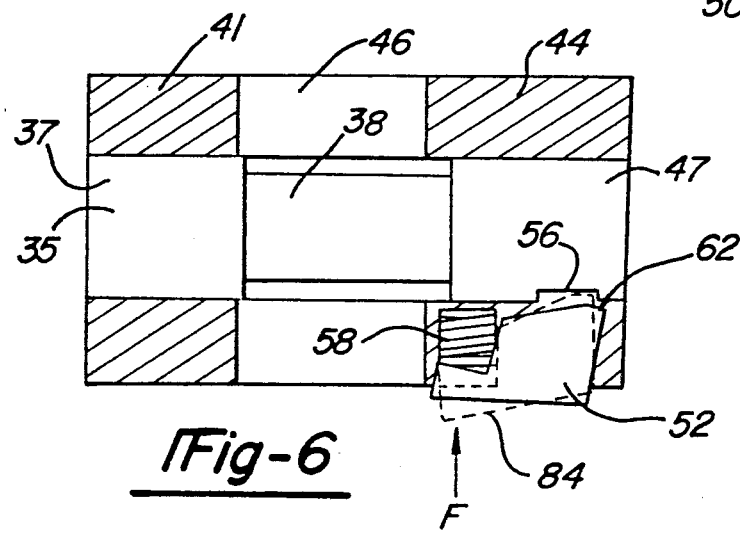
FIG. 6 illustrates a subsequent step in the removal of the arm from the mounting arrangement of the present invention.
Figure 7:
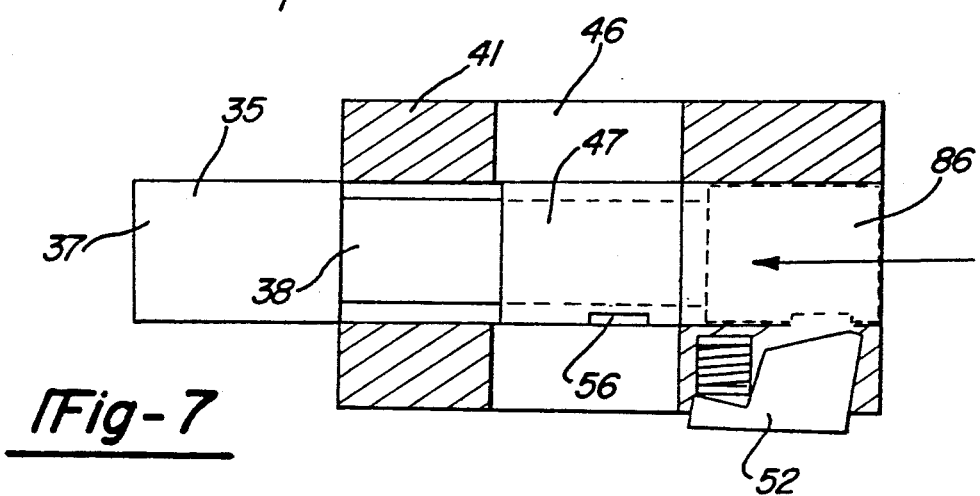
FIG. 7 illustrates the final steps in the removal of the arm from the mounting arrangement of the present invention.

The removal of arm 28 from mounting arrangement 32 is illustrated in somewhat simplified form in FIGS. 5-7. Inner mounting member 35 is fixed to the remainder of arm 28 and is received within mounting arrangement 32. In the mounted position shown in FIG. 5, spring 58 biases latch member 52 about pivot hole 60 such that latch tooth 62 is received within notch 56. Outward movement of inner mounting member 35 is prevented by latch member 52, since latch tooth 62 abuts flange 57. Lock nut 48 is initially at a locked position, with upper face 66 moved downwardly toward lower face 67, locking inner mounting member 35 within mounting arrangement 32.

When it is desired to remove inner mounting member 35 from mounting arrangement 32, handle 50 is moved to unlocked position 82, shown in phantom, in FIG. 5. Lock nut 48 moves on bolt 68, allowing upper face 65 to move vertically upwardly away from lower face 66. This unlocks inner mounting member 35 from mounting arrangement 32 by increasing the inner dimension of second mounting portion 44. Latch tooth 62 remains within notch 56, and inner mounting member 35 remains latched within mounting arrangement 32.

As shown in FIG. 6, a force F is applied to latch member 52 and pivots latch member 52 about pivot hole 60 such that latch tooth 62 is removed from notch 56. Latch member 52 is illustrated in an unlatched position having been moved from latched position 84, shown in phantom. Once latch tooth 62 is removed from latch 56, inner mounting member 35 is both unlocked and unlatched from mounting arrangement 32.

As shown in FIG. 7, inner mounting member 35 may now be moved axially forwardly until recessed section 38 aligns with first mounting portion 41. Second enlarged section 47 is aligned with intermediate open portion 46 and inner mounting member 35 may be moved vertically upwardly and removed from mounting arrangement 32. Recessed section 38 passes between the opening defined by flanges 42 and 43 and second enlarged section 47 passes upwardly through open intermediate portion 46. Upon the initial forward movement, the plug connections within arm 28 will be removed from plug 76 in electrical connector 72.

Mounting plate 40 and guide faces 63 and 68 are not illustrated in FIGS. 5-7. It should be understood, however, that when arm 28 is removed from mounting arrangement 32, guide face 63 is received upon guide face 68, and the initial movement of arm 28 is properly guided with respect to mounting arrangement 32. In addition, flat guide face 63 extends over a much greater axial distance than guide face 68 such that the guide faces ride on each other for the majority of the movement of arm 28 with respect to mounting arrangement 32.

To remove arm 28, it is only necessary that it be moved forwardly of mounting arrangement 32 by an axial distance approximately equal to the length of first enlarged section 37; in the illustrated embodiment, this is about one-third of the overall axial support distance. In a prior art arrangement, it may be necessary to move an arm forwardly throughout the entire axial support distance. The present invention provides efficient use of space in the vicinity of mounting arrangement 32. By lowering the required distance of movement, the frictional forces that must be overcome to remove arm 28 are greatly reduced. Arm 28 may be utilized for a variety of purposes and may mount multi-purpose members, such as gripper handle 22.

When mounting arm 28 within mounting arrangement 32, the steps of FIGS. 5-7 are followed in reverse. Recessed section 38 is aligned over first mounting portion 41, and second enlarged section 47 is received within open intermediate portion 46. Arm 28 is moved downwardly with recessed section 38 passing into the opening in first mounting portion 41, and first enlarged section 37 passing into the channel in mounting plate 40. Arm 28 is then moved rearwardly with flat face 63 guided along flat guide 68 until flange 70 abuts lip 71 and second enlarged section 47 is received within second mounting portion 44. During this rearward movement, flange 47 will contact latch member 52 and pivot it against the force of spring 58. Once flange 57 has moved past latch tooth 62, spring 58 pivots latch member 52 in the opposite direction and latch tooth 62 moves into notch 56. Arm 28 is latched to mounting arrangement 32. Handle 50 is then turned from unlocked position 72 back to a locked position, and arm 28 is locked to mounting arrangement 32.

While arm 28 is being slid rearwardly, flat guide face 63 ensures that the arm is properly oriented with respect to mounting arrangement 32 and electrical connector 72. Plug 76 will be properly aligned with the mating plug in arm 28, and required electrical connections are thus quickly made.

FIG. 8 is a side view of electrical connector 72, including plug member 80 extending rearwardly of connector 70. Connection 73 is received on plug 80.

FIG. 9 is a front view of electrical connector 72. Plug 76 is illustrated having a number of contact numbers which mate with corresponding members within arm 28.

Although the present invention has been illustrated in combination with a work transfer assembly, is should be understood that its teachings would apply to any application where it is necessary to mount an arm to a structure.

A preferred embodiment of the present invention has been disclosed; however, a worker of ordinary skill in the art would realize that certain modifications would be considered within the scope of this invention, and thus the following claims should be studied in order to determine the true scope and content of the present invention.

I claim:

1. An assembly comprising:
   an arm extending along an arm axis from a forward position to a rear position, said arm having a first enlarged section of a first outer dimension and a recessed section of a second outer dimension, said second dimension being smaller than said first dimension, said recessed section being axially spaced from said first enlarged section;
   a mounting arrangement extending along a mount axis from a forward position to a rear position and having a first mount portion with an inner peripheral surface, said first mount portion having an inner dimension approximately equal to said fist outer dimension, said first enlarged section being received in said first mount portion, said inner peripheral surface extending for less than 360 degrees about said mount axis, an access slot being defined as the section of 360 degrees that said inner peripheral surface does not extend over, said access slot providing access to said inner peripheral surface of said first mount portion, said access slot extending for a dimension greater than said second dimension such that said recessed section can pass through said access slot; and
   said mounting arrangement has a flat guide face, said first enlarged section having a mating flat face.

2. An assembly as recited in claim 1, wherein said enlarged section and said recessed section having generally cylindrical outer peripheries, and said inner peripheral surface being generally cylindrical.

3. An assembly as recited in claim 1, wherein said mounting arrangement has a second mount portion spaced axially rearwardly from said first mount portion and an intermediate portion of said mounting arrangement being spaced between said first and second mount portions, said intermediate portion being upwardly open, said arm having a second enlarged section supported in said mount portion, said recessed section being axially intermediate said first and second enlarged sections.

4. An assembly as recited in claim 3, wherein said access slot is formed at a vertically uppermost extent of said first mount portion.

5. An assembly comprising:
   an arm extending along an arm axis form a forward position to a rear position, said arm having a first enlarged section of a first outer dimension and a recessed section of a second outer dimension, said second dimension being smaller than said first dimension, said recessed section being axially spaced from said first enlarged section;
   a mounting arrangement extending along a mount axis from a forward position to a rear position and having a first mount portion with an inner peripheral surface, said first mount portion having an inner dimension approximately equal to said first outer dimension, said first enlarged section being received in said first mount portion, said inner peripheral surface extending for less than 360 degrees about said mount axis, an access slot being defined as the section of 360 degrees that said inner peripheral surface does not extend over, said access slot providing access to said inner peripheral surface of said first mount portion, said access slot extending for a dimension greater than said second dimension such that said recessed section can pass through said access slot;

said mounting arrangement has a second mount portion spaced axially rearwardly from said first mount portion and an intermediate portion of said mounting arrangement being spaced between said fist and second mount portions, said intermediate portion being upwardly open, said arm having a second enlarged section supported in said second mount portion, said recessed section being axially intermediate said first and second enlarged sections; and wherein said second enlarged section has a third outer dimension, and said second mount portion has an inner dimension approximately equal to said third dimension, said third dimension being greater than said second dimension.

6. An assembly comprising:

an arm extending along an arm axis from a forward position to a rear position, said arm having a first enlarged section of a first outer dimension and a recessed section of a second outer dimension, said second dimension being smaller than said first dimension, said recessed section being axially spaced from said first enlarged section;

a mounting arrangement extending along a mount axis from a forward position to a rear position and having a first mount portion with an inner peripheral surface, said fist mount portion having an inner dimension approximately equal to said first outer dimension, said first enlarged section being received in said first mount portion, said inner peripheral surface extending for less than 360 degrees about said mount axis, an access slot being defined as the section of 360 degrees that said inner peripheral surface does not extend over, said access slot providing access to said inner peripheral surface of said first mount portion, said access slot extending for a dimension greater than said second dimension such that said recessed section can pass through said access slot;

said mounting arrangement has a second mount portion spaced axially rearwardly from said first mount portion and an intermediate portion of said mounting arrangement being spaced between said first and second mount portions, said intermediate portion being upwardly open, said arm having a second enlarged section supported in said second mount portion, said recessed section being axially intermediate said first and second enlarged sections; and said second mount portion having spaced upper and lower faces defining a slot therebetween, said second mount portion receives a bolt for moving said upper face downwardly toward said lower face to lock said second enlarged section within said second mount portion.

7. An assembly as recited in claim 6, wherein said slot receives a latch member, said second enlarged section having a notch, said latch member being normally spring-biased into said notch, said latch member pivoting about a pivot hole, said bolt passing through said pivot hole.

8. An assembly as recited in claim 7, wherein said second enlarged section has a flange rearwardly of said notch, and movement of said second enlarged section forwardly of said second mount portion being prevented by said latch member abutting said flange.

9. An assembly as recited in claim 1, wherein a latch member is mounted to said mounting arrangement and selectively engages a surface of said arm to retain said arm in a latched position within said mounting arrangement.

10. An assembly as recited in claim 9, wherein said latch member is spring-biased into said arm.

11. An assembly comprising:

an arm extending along an arm axis from a forward position to a rear position, said arm having a first enlarged section of a first outer dimension measured from said arm axis and a recessed section of a second outer dimension measured from said arm axis, said second dimension being smaller than said first dimension, and recessed section being spaced axially rearwardly from said first enlarged section;

a mounting arrangement extending along a mount axis substantially equivalent to said arm axis from a forward position to a rear position and having a first mount portion with an inner peripheral surface, said first amount portion having an inner dimension approximately equal to said first outer dimension, said first enlarged section being received in said first mount portion, said inner peripheral surface extending for less than 360 degrees about said mount axis, an access slot being defined as the section of 360 degrees that said inner peripheral surface does not extend over, said access slot providing access slot extending for a dimension greater than said second dimension such that said recessed section can pass through said access slot; and said arm having a nominal outer dimension over the majority of 360 degrees of its outer circumference at a particular axial position, but having a smaller portion of a smaller outer dimension over at least a portion of said outer circumference at said particular axial position, said mounting arrangement including an anti-rotation portion extending radially inwardly beyond said nominal outer dimension at a circumferential and axial position associated with said smaller outer dimension portion such that said anti-rotation portion of said mount arrangement engages said smaller dimension portion of said arm and prevents relative rotation of said arm and said mounting arrangement.

12. An assembly as recited in claim 11, wherein said mounting arrangement anti-rotation portion has a flat guide face, and said smaller dimension portion is in said first enlarged section and has a mating flat face.

13. An assembly as recited in claim 12, wherein said mating flat face on said first enlarged section terminates in a flange, said flange abutting a lip on said mounting arrangement when said arm is fully received within said mounting arrangement.

14. An assembly as recited in claim 1, wherein said arm is hollow.

15. An assembly as recited in claim 1, wherein said arm mounts a gripper handle for a work transfer assembly.

16. An assembly comprising:

an arm extending along an arm axis from a forward position to a rear position, said arm having a first enlarged section of a first outer dimension and a recessed section of a second outer dimension, said second dimension being smaller than said first dimension, said recessed section being axially spaced from said first enlarged section;

a mounting arrangement extending along a mount axis from a forward position to a rear position and having a first mount portion with an inner peripheral surface, said first mount portion having an inner dimension approximately equal to said first outer dimension, said first enlarged section being received in said first mount portion, said inner peripheral surface extending for less than 360 degrees about said mount axis, an access slot being defined as the section of 360 degrees that said inner peripheral surface does not extend over, said access slot providing access to said inner peripheral surface of said first mount portion, said access slot extending for a dimension greater than said second dimension such that said recessed section can pass through said access slot; and an electrical connector is attached to said mounting arrangement, said electrical connector being connected to an electrical connection, said electrical connector having a plug, said arm having a mating plug, said plugs being connected and providing an electrical connection to said arm from a position outside of said mounting arrangement.

17. A work transfer assembly comprising:

a gripper handle for gripping a workpiece, a work transfer device for moving said gripper handle, an arm interconnecting said gripper handle and said work transfer device and extending along an arm axis form a forward position to a rear position, said arm having a first enlarged section of a first outer dimension and a recessed section of a second outer dimension, said second dimension being smaller than said first dimension, said recessed section being axially spaced from said first enlarged section;

a mounting arrangement extending along a mount axis from a forward position to a rear position and having a first mount portion for supporting said arm, said first mount portion having an inner dimension approximately equal to said first outer dimension, said first mount portion having an access slot to said inner dimension of said first mounting portion, said access slot extending for a dimension greater than said second dimension such that said recessed section can pass through said access slot; and said mounting arrangement has a mount portion spaced axially rearwardly from said first mount portion, and an intermediate portion disposed between said first and second mount portions, said intermediate portion being upwardly open, said arm having a second enlarged section, said recessed section being axially intermediate said first and second enlarged sections.

18. A work transfer assembly comprising:

a gripper handle for gripping a workpiece, a work transfer device for moving said gripper handle, an arm interconnecting said gripper handle and said work transfer device and extending along an arm axis from a forward position to a rear position, said arm having a first enlarged section of a first outer dimension and a recessed section of a second outer dimension, said second dimension being smaller than said first dimension, said recessed section being axially spaced from said first enlarged section;

a mounting arrangement extending along a mount axis from a forward position to a rear position and having a first mount portion form supporting said arm, said first mount portion having an inner dimension approximately equal to said first outer dimension, said first mount portion having an access slot to said inner dimension of said first mounting portion, said access slot extending for a dimension greater than said second dimension such that said recessed section can pass through said access slot; and wherein an electrical connector is attached to said mounting arrangement, said electrical connector being connected to an electrical connection said electrical connector having a plug, said arm having a mating plug, said plugs being connected and providing an electrical connection to said arm from a position outside of said mounting arrangement.

19. A work transfer assembly as recited in claim 18, wherein there are cooperating means attached to said arm and said mounting means to ensure that said arm is properly aligned within said mounting arrangement, and that said plugs are properly aligned with respect to each other.

20. An assembly comprising:

an arm extending along an arm axis from a forward position to a rear position, said arm having a first enlarged section of a first outer dimension measured from said arm axis and a recessed section of a second outer dimension measured from said arm axis, said second dimension being smaller than said first dimension, and recessed section being spaced axially rearwardly from said first enlarged section;

a mounting arrangement extending along a mount axis substantially equivalent to said arm axis from a forward position to a rear position and having a first mount portion with an inner peripheral surface, said first mount portion having an inner dimension approximately equal to said first outer dimension, said first enlarged section being received in said first mount portion, said inner peripheral surface extending for less than 360 degrees about said mount axis, an access slot being defined as the section of 360 degrees that said inner peripheral surface does not extend over, said access slot providing access to said inner peripheral surface of said first mount portion, said access slot extending for a dimension greater than said second dimension such that said recessed section can pass through said access slot; and said mounting arrangement has a second mount portion spaced axially rearwardly from said first mount portion and an intermediate portion of said mounting arrangement being spaced between said first and second mount portions, said intermediate portion being upwardly open, said arm having a second enlarged section supported in said second mount portion, said recessed section being axially intermediate said first and second enlarged sections.

* * * * *

UNITED STATES PATENT AND TRADEMARK OFFICE
CERTIFICATE OF CORRECTION

PATENT NO. : 5,071,309

DATED : December 10, 1991

INVENTOR(S) : Herbermann, Alfred F.

It is certified that error appears in the above-identified patent and that said Letters Patent is hereby corrected as shown below:

In column 8, line 16, the word "fist" should read --first--.

In column 8, line 41, the word --second-- should be inserted before the word "mount".

In column 8, line 48, the word "form" should read --from--.

In column 9, line 7, the word "fist" should read --first--.

In column 9, line 29, the word "fist" should read --first--.

In column 10, line 29, --to said inner peripheral surface of said first mount portion, said access-- should be inserted before the word "slot".

In column 11, line 29, the word "form" should read --from--.

In column 11, line 46, the word --second-- should be inserted before the word "mount".

In column 12, line 5, the word "form" should read --for--.

Signed and Sealed this

Twenty-third Day of March, 1993

*Attest:*

STEPHEN G. KUNIN

*Attesting Officer*     Acting Commissioner of Patents and Trademarks